2,834,795

METHOD OF PREPARING SULFUR-CONTAINING ORGANIC MERCURIAL DIURETICS AND INTERMEDIATES THEREFOR

Gerhard R. Wendt, Havertown, Pa., assignor to American Home Products Corporation, New York, N. Y., a corporation of Delaware No Drawing. Application November 5, 1953
Serial No. 390,410

3 Claims. (Cl. 260—431)

This invention relates to an improved method of preparing sulfur-containing organic mercurial diuretics and intermediates therefor. More particularly it relates to the utilization of the salts of novel N-(γ-halomercuri-β-methoxy)-propyl-camphoramic acids as intermediates in the preparation of such diuretics, to the novel halomercuri compounds and to their method of preparation.

My new intermediates are the chloro- and bromo-camphoramic acid derivatives having the following structure:

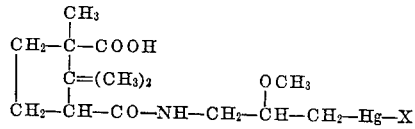

in which X is Cl or Br.

In U. S. Patent 2,576,349, patented November 27, 1951, Robert A. Lehman discloses and claims water-soluble sulfur-containing organic mercury compounds having diuretic properties. A preferred embodiment of this invention which has met with wide and favorable acceptance among physicians is made by condensing the sodium salt of N-(γ-hydroxymercuri-β-methoxy)-propyl-d-α-camphoramic acid with disodium thioglycolate in aqueous solution, producing a compound having the following structure:

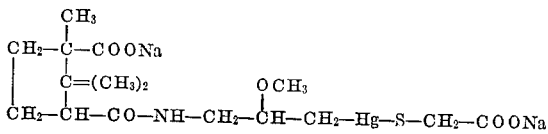

This method of preparation has certain disadvantages. The hydroxymercuri-camphoramic acid derivative used as one of the starting materials is an amorphous water-insoluble compound which it has so far been impossible to crystallize; it is difficultly soluble in organic solvents such as methanol, ethanol, acetone and the like. It is relatively unstable, it is difficult to purify, and its condensation with the thioglycolate must be carried out in an aqueous medium which involves difficulties in isolating and drying the final product.

My new halo compounds, on the other hand, can be readily crystallized, are easily purified, are difficultly soluble in water but soluble in neutral oxygen-containing solvents such as the lower alcohols and ketones—for example, methanol, ethanol, the propanols, acetone, methylethyl ketone and dioxane—and are very stable. They condense readily with thioglycolic acid salts in such nonaqueous media.

As a result of these properties, I can purify them— e. g. by dissolving in aqueous acetone, partially evaporating and then cooling the solution, or less satisfactorily by concentrating a methanol or acetone solution—and store the purified product without fear of deterioration. This is obviously a great advantage in commercial organic syntheses in which my new acids are involved.

In condensing my halomercuri-camphoramic acid derivatives with thioglycolic acid I use a volatile non-aqueous medium such as methanol. This has several advantages over water. Separation of the end product is easy, freeze-drying not being required. Disodium di-thiodiglycolate may be formed during the condensation either by the old or new method; this is an active decomposition catalyst for the desired end product and hence a deleterious by-product. Disodium dithiodiglycolate is soluble in water, but, if formed during a condensation carried out by my method in a non-aqueous solvent such as methanol, it precipitates out and can be filtered off, thus being eliminated from the reaction zone, where it would act destructively, and from the final product, whose stability it would seriously limit. Finally, in carrying out the condensation with my halomercuri acids in an anhydrous medium such as methanol, an excess of disodium thioglycolate is unnecessary since the reaction approaches quantitative completion. Instead of methanol another lower alkanol may be used as the reaction medium.

The fact that my halomercuri acids may be highly purified ensures a more clean-cut reaction than was previously possible.

The following examples illustrate the synthesis of my halomercuri acids and their use in preparing the mercurial diuretic of Example I of the Lehman patent referred to above, but these examples are intended to be illustrative only and not to limit my invention, the scope of which is defined in the accompanying claims.

EXAMPLE 1

*Preparation of dl-N-(γ-chloromercuri-β-methoxy)-propyl-camphoramic acid*

A suspension of 31.9 g. (=0.10 M) of mercuric acetate in 25 ml. of methanol is stirred for 30 minutes at room temperature in a four necked flask equipped with stirrer, dropping funnel, drying tube and thermometer. To this suspension is added dropwise and with stirring, a solution of 23.9 g. (=0.10 M) of dl-N-allyl-camphoramic acid

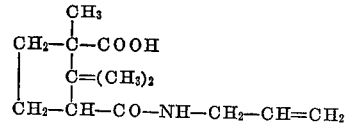

in 65 ml. of methanol over a period of 30 minutes. The temperature of the reaction mixture should not rise over 30° C. The stirring is continued for one hour. The reaction mixture is allowed to stand at room temperature over night in the dark to complete the reaction. A solution of 5.9 g. (=0.10 M) of sodium chloride in 25 ml. of water is added and the stirring is continued for four hours. The small amount of gray precipitate produced is removed by centrifuging. The colorless, clear supernatant is concentrated to about half of its original volume and then dropped into 300 ml. of water with stirring. The white precipitate which forms is filtered and dried at 80° C., yielding 45 g. of chloromercuri acid (=89% of the theory), M. P. 106–109° C. (decomp.). This compound is finally obtained in analytically pure form and with a constant melting point by two recrystallizations from acetone-water. M. P. 131–132° C. (decomposition). Its formula is:

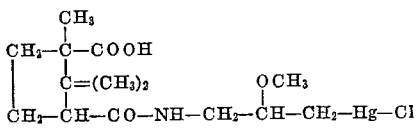

|  | Cl | N | OCH₃ |
|---|---|---|---|
| Analysis: Calcd. for C₁₄H₂₄Hg Cl NO₄ | 7.00 | 2.77 | 6.12 |
| Found | 6.70 | 2.55 | 6.09 |

The ammonium, sodium, calcium and lead salts of dl-N-(γ-chloromercuri-β-methoxy)-propyl-camphoramic acid have the following properties:

*Ammonium salt.*—Amorphous, white substance; moderately soluble in water with decomposition.

*Analysis.*—Calcd. for $C_{14}H_{27}HgClN_2O_4$: N, 5.35. Found: N, 5.16.

*Sodium salt.*—Clusters of needles from methanol-acetone; slightly soluble in water with decomposition.

*Analysis.*—Calcd. for $C_{14}H_{23}HgClNNaO_4$: N, 2.65. Found: N, 2.32.

*Calcium salt:* Clusters of crystals from methanol-acetone; slightly soluble in water with decomposition.

*Analysis.*—Calcd. for $C_{14}H_{23}\frac{Ca}{2}HgClNO_4$; N, 2.66. Found: N, 2.77.

*Lead salt.*—Amorphous white substance; slightly soluble in water.

*Analysis.*—Calcd. for $C_{14}H_{23}HgClNO_4\frac{Pb}{2}$: N, 2.30. Found: N, 2.86.

EXAMPLE 2

*Condensation of the sodium salt of the chloromercuri acid of Example 1 with disodium thioglycolate* a. *Preparation of the chloromercuri acid sodium salt solution.*—50.6 g. (=0.100 M) of the chloromercuri acid of Example 1 (dried over CaCl₂ at 0.1 mm. and room temperature overnight) is dissolved in 100 ml. of warm methanol. To this solution 6.0 g. (=0.111 M) of sodium methylate is added in small portions with constant stirring, so that the temperature of the solution does not rise over 30° C. The solution is centrifuged, and the glass is rinsed with 10 ml. of methanol. The final pH of the combined solutions is 8.5.

b. *Preparation of the disodium thioglycolate solution.*—The following steps are carried out under nitrogen: To 9.2 g. (=0.100 M) of freshly distilled thioglycolic acid (b. p. 2 mm. 84–85° C.) in 100 ml. of methanol in a flask is added 12.0 g. (=0.222 M) of sodium methylate in small portions with stirring. The turbid solution is poured into a dropping funnel and the flask is rinsed with 20 ml. of methanol. The final pH of the combined methanolic solutions is 11.

c. *Condensation.*—The solution of disodium thioglycolate is added dropwise from the dropping funnel with a stirring over a period of 45 minutes in an atmosphere of nitrogen to the chloromeruci acid sodium salt solution. The pH of the mixture will be 10–11. The reaction mixture is stirred for another three hours and it is then allowed to stand for 20 hours at room temperature in the dark. It is centrifuged and the glass is rinsed with 20 ml. of methanol. The combined methanol solutions are allowed to drop into 1250 ml. of acetone over a period of 1 hour. The white precipitate is filtered off on a Buchner funnel, and the white cake is washed with 250 ml. of acetone. Before it is completely dry it is transferred quickly to a vacuum desiccator in order to remove the adhering solvents. (Oil pump, 0.1 mm., room temperature.) The yield is 34.7 g. or 71.5% of the theory. Another 1.2 g. of precipitate is obtained by the addition of 500 ml. of acetone to the above filtrate. The overall yield of the crude product is 74.1% of the → theory.

The reaction may be represented as follows:

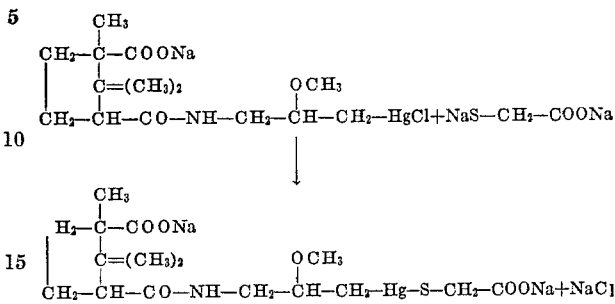

The crude product may be crystallized from methanol-acetone, methanol-isopropanol or ethanol-acetone with a yield of over 85% by weight of the crude.

EXAMPLE 3

*Preparation of dl-N-(γ-bromomercuri-β-methoxy)-propyl-camphoramic acid*

To a mixture of 21.66 g. (=0.10 M) of mercuric oxide and 6.7 ml. of glacial acetic acid is added a solution of 23.9 g. (=0.10 M) of dl-N-allyl-camphoramic acid in 100 ml. of methanol. The reaction mixture is stirred for half an hour at room temperature and is then refluxed for one hour. Some insoluble material is removed by filtration and the solution of 10.3 g (=0.10 M) of sodium bromide in 25 ml. of water is added to the warm filtrate. After clarifying by filtration the solution is added dropwise and with stirring to 600 ml. of water. The granular precipitate after washing with water and drying over anhydrous calcium chloride amounts to 72%. After two recrystallizations from acetone-water the bromomercuri compound melts at 124–125° C. The compound is slightly soluble in water, crystallizing in plates.

Its formula is

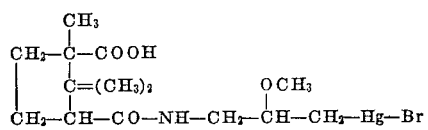

*Analysis.*—Calcd. for $C_{14}H_{24}HgBrNO_4$: Br, 14.51; N, 2.54. Found: Br. 13.96, 13.80; N, 2.52.

The bromo compound may be condensed with disodium thioglycolate in the same way as the chloro compound to prepare the Lehman diuretic in an improved state of purity and stability.

From the above disclosure it will be seen that my discovery of the new chloro- and bromomercuri- camphoramic acids described has made possible an improved synthesis of Lehman's diuretic compound in non-aqueous solvents with the attendant advantages of improved yields, improved purity and improved stability.

The condensation product of Example 2c, made from the dl-N-(γ-chloromercuri-β-methoxy)-propyl-camphoramic acid of Example 1, has been found to be a diuretic equally as effective as Lehman's corresponding d-compound of his Example I, and easier to crystallize than the latter.

I claim:

1. The method of preparing a compound having the formula

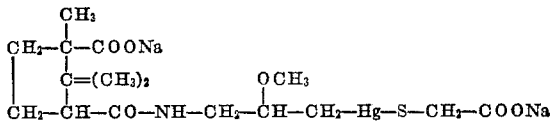

which comprises condensing in an inert atmosphere and in a non-aqueous lower alcoholic medium a compound having the formula

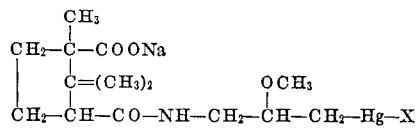

in which X is a halogen selected from the class consisting of chlorine and bromine, with a solution of disodium thioglycolate in a lower alkanol in the presence of sufficient sodium lower alkanolate to bring the pH into the range 10–11, filtering the reaction mixture, adding the filtrate to a multiple volume of a lower ketone, and filtering off the resulting precipitate.

2. The method of preparing a compound having the formula

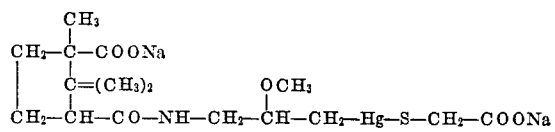

which comprises reacting in an inert atmosphere a solution of sodium N-(γ-chloromercuri-β-methoxy)-propyl-camphoramate in methanol with a solution of disodium thioglycolate in methanol in the presence of sufficient sodium methylate to bring the pH into the range 10–11, filtering the reaction mixture, adding the filtrate to a multiple volume of acetone, filtering off the resultant precipitate and drying it at room temperature in vacuo.

3. The method of preparing a compound having the formula

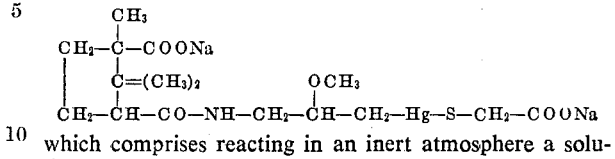

which comprises reacting in an inert atmosphere a solution of sodium N-(γ-bromomercuri-β-methoxy)-propyl-camphoramate in methanol with a solution of disodium thioglycolate in methanol in the presence of sufficient sodium methylate to bring the pH into the range 10–11, filtering the reaction mixture, adding the filtrate to a multiple volume of acetone, filtering off the resultant precipitate and drying it at room temperature in vacuo.

References Cited in the file of this patent
UNITED STATES PATENTS

| | | |
|---|---|---|
| 2,117,901 | Molnar | May 17, 1938 |
| 2,576,349 | Lehman | Nov. 27, 1951 |
| 2,635,983 | Foreman | Apr. 21, 1953 |

OTHER REFERENCES

Rowland: J. Am. Chem. Soc., vol. 73, pp. 91–93, January 1951.

Rowland et al.: J. Am. Chem., vol. 72, pp. 3595–98.

UNITED STATES PATENT OFFICE
Certificate of Correction

Patent No. 2,834,795                                                             May 13, 1958

Gerhard R. Wendt

It is hereby certified that error appears in the printed specification of the above numbered patent requiring correction and that the said Letters Patent should read as corrected below.

Column 3, line 42, for the indistinct printed matter at the beginning of the line read —acid—; line 61, strike out "a", first occurrence; line 62, for "chloromeruci" read —chloromercuri—; column 4, line 2, strike out the arrow at the end of the line; lines 12 to 16, left-hand portion of the formula should read as shown below instead of as in the patent—

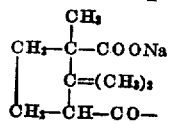

line 49, for "Br. 13.96" read —Br, 13.96—.

Signed and sealed this 8th day of July 1958.

[SEAL]

Attest:
KARL H. AXLINE,
*Attesting Officer.*

ROBERT C. WATSON,
*Commissioner of Patents.*